June 17, 1958  F. P. LESTER ET AL  2,839,209
CERAMIC STRUCTURE AND METHOD FOR MAKING SAME
Original Filed Feb. 12, 1954  2 Sheets-Sheet 1
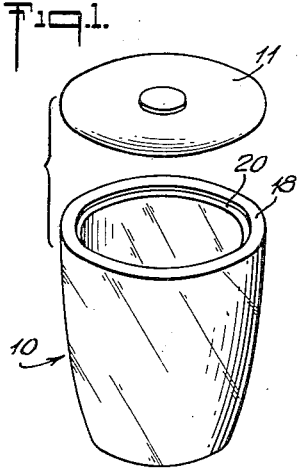
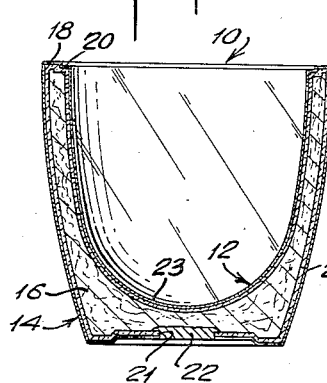
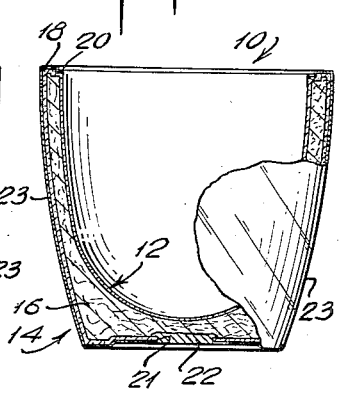
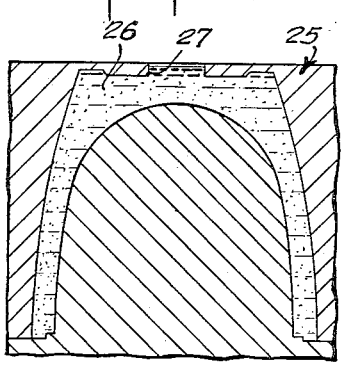
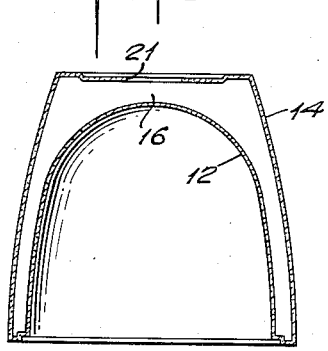
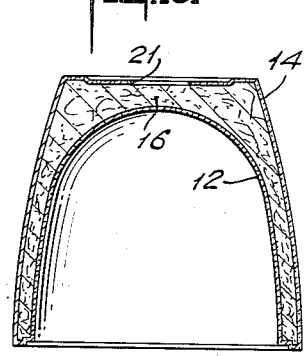
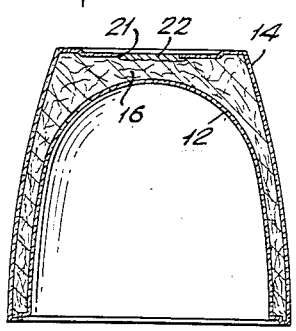
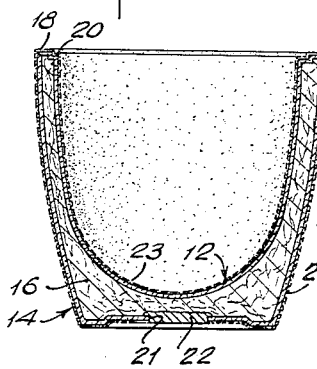
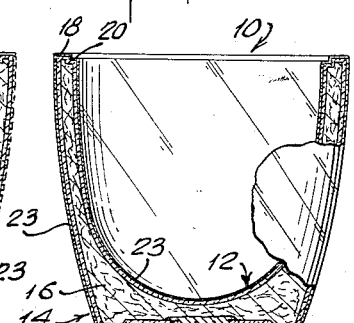
INVENTOR
FRANK P. LESTER
MARIANNE H. LESTER
ATTORNEY

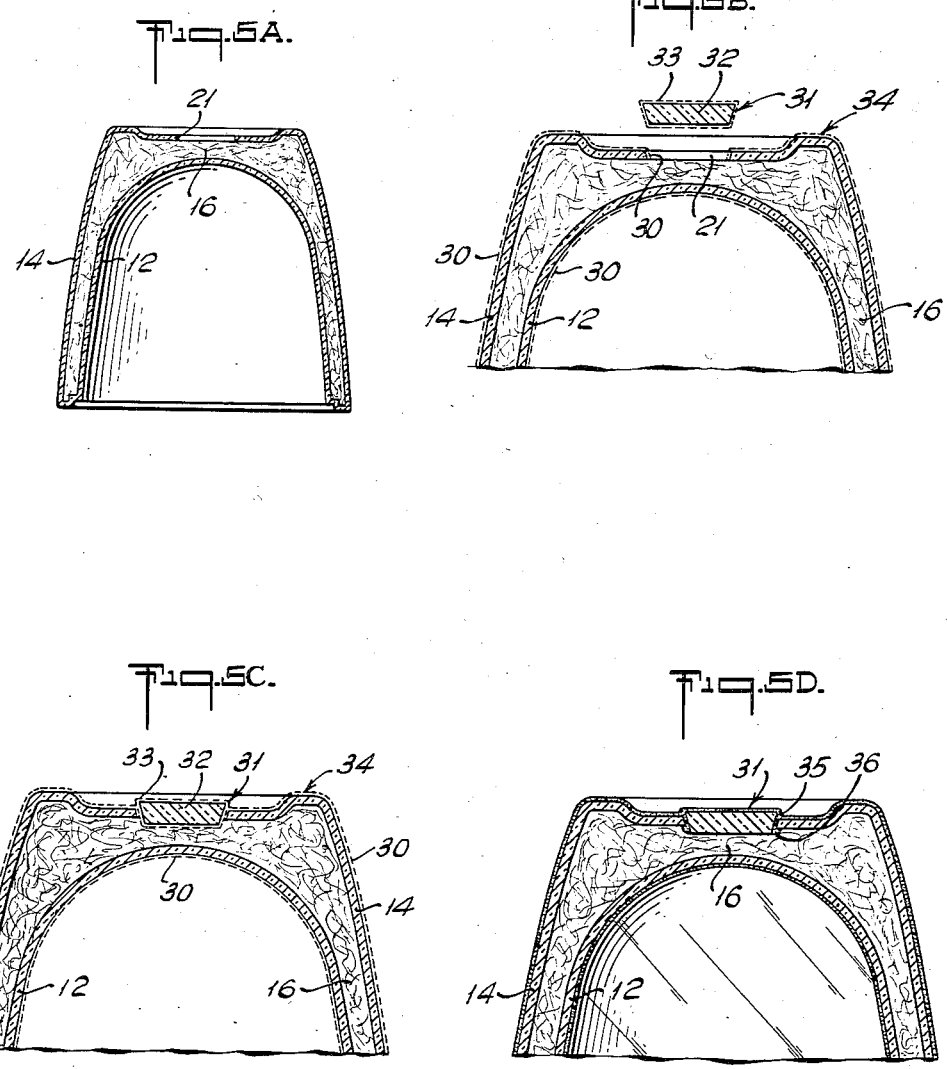

United States Patent Office 2,839,209
Patented June 17, 1958

2,839,209
CERAMIC STRUCTURE AND METHOD
FOR MAKING SAME

Frank P. Lester and Marianne H. Lester, Hartsdale, N. Y.

Continuation of application Serial No. 409,868, February 12, 1954. This application March 1, 1955, Serial No. 491,261

3 Claims. (Cl. 215—13)

This invention relates to receptacles or containers for foods, drugs and other materials and more specifically concerns among other things an improved ceramic container particularly adapted for the storage of hot and cold food and other products to impede the discharge and absorption of heat and an improved method for manufacturing such containers. This application in one aspect constitutes a continuation of our application for U. S. patent Serial No. 409,868, filed February 12, 1954, now abandoned, entitled Ceramic Structure and Method for Making Same and in another aspect constitutes an independent invention.

Objects and advantages of the invention will be set forth in part hereinafter and in part will be obvious herefrom or may be learned by practice with the invention, the same being realized and attained by means of the instrumentalities, combinations and methods pointed out in the appended claims.

The invention consists in the novel parts, arrangements, combinations, improvements and methods herein shown and described.

The accompanying drawings referred to herein and constituting part hereof, illustrate certain embodiments of the invention and together with the description serve to explain the principles of the invention.

In the drawings:

Fig. 1 is a perspective view of one embodiment of a ceramic vessel or container in accordance with the invention;

Fig. 2 is a cross sectional view of the embodiment of the invention shown in Fig. 1;

Fig. 3 is a cross sectional view of another embodiment of the invention;

Figs. 4A to 4F show several steps in accordance with one method of making a ceramic structure in accordance with the invention; and Figs. 5A through 5D illustrative another method of fabricating a ceramic article in accordance with the invention.

Broadly the invention concerns a double walled ceramic structure constructed and sealed to provide a substantially air tight compartment between the walls. Notwithstanding the presence or absence of air in the compartment, it has been found that the structure can be subjected to temperature difference of 500° F. and even greater without the danger of cracking or otherwise damaging the walls. In addition actual tests have shown that this invention, when used in the form of a bucket for the storage of hot or cold foods or other products, will substantially maintain the temperature of such products for extended periods of time. While ceramic structures have heretofore been made with double walls, in order to conserve materials, to our knowledge they did not contemplate nor were they so arranged and constructed as to attain the objects and advantages of this invention.

In another aspect, the invention is useful for the storage of products such as tobacco, cigarettes or other articles requiring a humid atmosphere.

This new and improved structure which may be applied to ice buckets, soup tureens, tea and coffee pots, trivits, hot plates, food warmers, transportation of drugs and other similar purposes, may be arranged as mentioned above with either a dead air space or vacuum between the walls. In the latter case the opening to the air space may be closed by a ceramic plug inserted before the initial firing whereby a vacuum is produced during the firing procedure as will be discussed in connection with the figures.

Referring now to the drawing, and more specifically to Fig. 1 thereof showing a ceramic structure 10 in accordance with the invention, this embodiment is in the form of a bowl that may be used for ice, hot foods and the like though it will become apparent that the principles thereof may be employed in other articles such as shallow dishes, glasses, cups, pots, trivits, etc. The bowl 10 is shown in cross section in Fig. 2 and may be provided with a cover 11 of metal, ceramic or other suitable material.

More specifically, the bowl 10 consisting of inner and outer members 12 and 14 nested one within the other so that a substantial space 16 is formed between the inner and outer walls. The two members are joined one to the other about the edge 18 of the bowl and this edge may be recessed as shown at 20 to receive a suitable cover. While these members may be joined in any desired manner, it is of course preferred that they be formed integrally one with the other to form a unitary structure and the completed article is provided with a suitable glaze 23 on all exposed surfaces to water proof the ceramic body and of course provide a finished product.

The space 16 between the inner and outer bowl parts is preferably filled with a thermal insulating material such as mica particles or the like of a size that will pass through a 6 or 8 mesh though any suitable substance may be used. This material is inserted through the opening 21 either before or after the bowl is fired and the opening is closed by a plug 22 that is preferably of a waterproof material. If the plug is inserted before firing it is apparent that it must withstand the firing temperatures and have a coefficient of expansion approximately equal to that of the ceramic material. Similarly the filler must also be able to withstand the firing temperatures if inserted before firing. While any suitable cement may be used as a plug in the case where the plug is inserted after firing it is preferable to incorporate about 5% iron filings in the mixture in order to secure a more perfect bond between the plug and the body of the structure.

Since the invention is intended for use as a thermal insulating device, the overlying layers of the composite wall structure and the glaze must be able to withstand temperature differentials of the order of 500° F. and even greater and of course withstand any pressures that may be created within the space 16 by reason of these temperature differences. A ceramic body mixture meeting these requirements may be made by mixing the following materials in their dry state:

| | Parts |
|---|---|
| Powdered glass | 12 |
| Bedminster clay | 9.5 |
| Jordan clay | 26 |
| Victoria clay | 7.5 |
| Layton clay | 4 |
| Exeter clay | 10 |
| Syanite | 8 |
| Soda spar | 10 |
| Barker talc | 3 |
| Powdered Hudson flint | 11 |

To this mixture is added 32.5 liters of water for each 100 lbs., 153 cc. sodium silicate and 130 grams sodium carbonate.

The glaze is of course equally as important as the ceramic body and an excellent white glaze may be made by preparing a dry mix of the following ingredients:

| | Parts |
|---|---|
| Powdered glass | 22 |
| Bainbridge feldspar | 11.95 |
| Bedminster clay | 5 |
| Layton clay | 5.95 |
| Calcined zinc | 5.60 |
| White lead | 10.4 |
| Whiting | 3.55 |
| Tin oxide | 23.75 |
| Zirconium silicate | 23.75 |
| Borax | 4.5 |

When the basic mix is completed then add 2 parts of talc for every 5 parts of the mixture and then approximately 3 parts water for each part of the final mixture including the talc.

While the chemical composition of the several clays used in forming the ceramic body and the glaze in accordance with this invention varies from one batch to another the general accepted composition of these clays are as follows:

Bedminister clay

| | |
|---|---|
| $SiO_2$ | 52.10 |
| $Al_2O_3$ | 32.47 |
| $Fe_2O_3$ | 1.47 |
| $TiO_2$ | 1.31 |
| Ignition | 9.13 |
| CaO | 0.24 |
| MgO | 0.55 |
| $Na_2O$ | 0.48 |
| $K_2O$ | 2.20 |

Layton clay

| | |
|---|---|
| $SiO_2$ | 47.96 |
| $Al_2O_3$ | 36.62 |
| $Fe_2O_3$ | 0.334 |
| $TiO_2$ | 1.23 |
| Ignition | 12.84 |
| CaO | 0.22 |
| MgO | 0.74 |
| $Na_2O$ | 0.31 |
| $K_2O$ | Trace |

Victoria clay

| | |
|---|---|
| $SiO_2$ | 58.76 |
| $Al_2O_3$ | 27.01 |
| $Fe_2O_3$ | 0.875 |
| $TiO_2$ | 1.56 |
| Ignition | 10.55 |
| CaO | 0.29 |
| MgO | 0.37 |
| $Na_2O$ | 0.36 |
| $K_2O$ | 0.27 |

Exeter clay

| | |
|---|---|
| $SiO_2$ | 47.83 |
| $Al_2O_3$ | 38.92 |
| $Fe_2O_3$ | 0.30 |
| $TiO_2$ | None |
| Ignition | 11.70 |
| CaO | None |
| MgO | 0.77 |
| $Na_2O$ | 0.41 |
| $K_2O$ | 0.64 |

Hudson flint 103

| | |
|---|---|
| $SiO_2$ | 99.92 |
| $Fe_2O_3$ | .012 |
| $Al_2O_3$ | .04 |
| $TiO_2$ | .008 |
| CaO | Trace |
| MgO | Trace |

Bainbridge feldspar

| | |
|---|---|
| $SiO_2$ | 65.5 |
| $Al_2O_3$ | 20.3 |
| $Fe_2O_3$ | 0.03 |
| Ignition loss | .2 |
| CaO | 2.0 |
| MgO | Trace |
| $Na_2O$ | 6.9 |
| $K_2O$ | 5.2 |

Jordan clay

| | |
|---|---|
| $SiO_2$ | 70.02 |
| $Al_2O_3$ | 18.29 |
| $Fe_2O_3$ | 1.57 |
| $TiO_2$ | 1.02 |
| Ignition | 6.19 |
| CaO | 0.18 |
| MgO | 0.23 |
| $Na_2O$ | 0.62 |
| $K_2O$ | 1.94 |

Barker talc #24

| | |
|---|---|
| $SiO_2$ | 58.6 |
| $Al_2O_3$ | 1.0 |
| $Fe_2O_3$ | 0.2 |
| $TiO_2$ | Trace to 0.05 |
| Ignition | 4.1 |
| CaO | 6.0–8.0 |
| MgO | 29.8 |

In applying the glaze to the ceramic body it is preferable to coat the body or structure with the glaze after drying and before firing whereupon only one firing will be required. However two separate firings may be employed but this procedure would of course increase the cost of the finished article.

While the embodiment of the invention illustrated in Figs. 1 and 2 is particularly useful as a thermal insulating device for holding hot or cold materials, it can with a slight modification shown in Fig. 3 be used for providing a humid atmosphere for articles such as tobacco and the like. The essential difference between the embodiments of Figs. 2 and 3 is that the glaze 23 has been omitted from the surface of the inner member to expose the ceramic material. Then by immersing the entire structure in water for a short time, the exposed surface and the mica or other filler will absorb a considerable quantity of water and thereby produce a highly humid atmosphere within the bowl. Since the outer member 14 of the bowl is glazed, the moisture retained by the filler and wall of the inner member 12 can escape only through the wall 12. Thus any material retained within the bowl will of course be maintained in a moist condition for extended periods of time without any danger of spilling the water or damaging the material by direct contact therewith.

As previously pointed out the embodiment of Fig. 2 may be prepared either with or without a vacuum in the compartment or space 16. The production of a vacuum within the space 16 may be accomplished in a manner now to be described in connection with Figs. 4A to 4F inclusive.

Fig. 4 illustrates a mold, in cross section, having a configuration that may be used in casting or molding a structure of the type shown in Figs. 1 to 3 inc. The body 25 of the mold is preferably of plaster of Paris or other suitable water absorbent material and is formed with a cavity 26 corresponding to the shape of the ceramic structure to be made. An opening 27 is provided in the top for insertion of the liquid ceramic mix as described above. This mix is permitted to remain in the mold a sufficient time to allow desired thickness of ceramic to be deposited about the walls of the cavity 26. The mold is then inverted to remove the excess mix and leave the deposited material in place. Thus a hollow structure is formed with an opening 21 as shown in Fig. 2.

The body 25 of the mold is of course made in two parts which are separated for the removal of the molded structure. This structure is shown in Fig. 4B and the finished casting has the inner and outer members 12 and 14 as discussed in connection with Figs. 1 to 3. In the manufacture of ceramic articles, one of two procedures may be employed for setting or firing the ceramic. One procedure involves a single firing wherein both the body and glaze are fired at the same time while in a double firing procedure the body is fired and then the glaze is applied and the article is fired again. Should the double firing procedure be employed, the structure of Fig. 4B is fired before any further processing steps. Should a single firing procedure be desired the structure of Fig. 4B is merely allowed to dry. Assuming for the present a single firing procedure, the next step is to fill the cavity 16 with an insulating material such as mica or the like that will withstand the high firing temperature usually of the order of 2200° F. The hole 21 is then filled with a ceramic mix identical to that used for the body but of a somewhat more viscous consistency to form the plug 22 in Fig. 4D. As soon as the plug dries, a glaze 23 is applied to all outside surfaces as illustrated in Fig. 4E. The entire assembly is now fired and in so doing the ceramic body consisting of the members 12 and 14 assumes a permanent set. This occurs however at a lower temperature than that at which the glaze melts. As a result the expanding air within the cavity 16 will leave through the minute pores of the body and the plug 22 will become firmly and intimately bonded to the edge of the opening 21 to form a substantially unitary outer member 14. As the temperature of the furnace is raised to about 2200° F., the glaze melts to seal the pores in the ceramic body and provides the desired finish for the article. Now as the furnace is cooled the glaze sets and prevents air from reentering the cavity 16 thereby causing a vacuum to be produced therein. Moreover the pressure of the air on the outside of the body tends to force the glaze into close contact with the body and effect an improved bond therebetween.

If a double firing procedure is desired the structure of Fig. 4B is fired and then the steps of Figs. 4C to F are followed as described above. Should a vacuum not be desired within cavity 16, the body of the structure and glaze may be processed by either the single or double firing procedures and then upon inserting a suitable filler, a plug 22 formed of any suitable cement may be used to close the opening 21. As pointed out above in cements of this character it is preferable to incorporate iron filings in the cement to effect a more perfect seal.

Still another method of fabricating a container in accordance with the invention is illustrated in Figs. 5A through 5D. The container of Fig. 5A corresponds generally with that shown in Fig. 4C and has an inner wall 12, an outer wall 14, a suitable insulating material 16 such as pulverized mica or the like disposed between the inner and outer walls and an opening 21 in the outer wall 14. It will be observed that the container as illustrated in this figure is in an inverted or firing position. At this step in the process the container has not been fired but merely filled with the insulating material 16. The next step in the process constitutes the application of a glaze 30 to all outer surfaces of the container as illustrated in Fig. 5B including the edges of the opening 21. When the glaze 30 has dried a plug 31 having an air dried ceramic body 32 and an outer air dried glaze 33 identical to the glaze 30 is placed lightly within the opening 21. This is shown in Fig. 5C of the drawings wherein it will be observed that the plug 31 by reason of a slightly tapered construction will be solely supported by the edges of the opening 21 with the top surface of the plug substantially below the raised edge 34 disposed about the periphery of the container base.

The container prepared in the manner illustrated in Fig. 5C is now fired by raising the temperature gradually to about 2200° F. As the furnace is heated the air remaining within the space between the walls 14 and 16 will expand and be discharged from the container primarily about the edges of the plug 31. At this point the ceramic container body has assumed a substantially permanent set and the glaze has melted. As the furnace is allowed to cool the glaze surrounding the plug 31 and the opening 21 will begin to set along with the glaze on the other parts of the container body. Inasmuch as the glaze forms a relatively dense impervious coating the hardening of the glazes about the plug 31 and in the opening 21 which have at this point melted and become intimately mixed one with the other form an air tight seal. The simultaneously hardening of the glaze on the walls 12 and 14 prevents the intake of air through other portions of the ceramic body. Thus when the container is finally brought to room temperature a substantial vacuum will have been created between the walls 12 and 14 which materially adds to the insulating qualities of the article.

The finished article prepared in accordance with this procedure is illustrated in Fig. 5D and it will be observed that the glaze about the plug 31 has formed small fillets 35 and 36 about the inner and outer edges of the plug which indicates the production of an effective seal between the plug and the container body. In this way a substantially unitary structure is formed having inner and outer walls with a vacuum created therebetween. By preparing the container in this manner the cost of construction is materially reduced and the plug cannot be dislodged from its opening by reason of physical or thermal shock and there is no danger of fluids seeping through the container walls and creating dangerously high steam pressures should the container be used for baking or cooking purposes.

It is apparent that the principles of the invention as described above may be readily applied to any type or shape of ceramic structure wherein heat insulating properties are required. In addition certain principles of the invention are also applicable to structures of the type discussed in connection with Fig. 3 for humidifying purposes.

While only certain embodiments of the invention have been shown and described it is evident that other modifications, changes and alterations may be made without departing from the true scope and spirit thereof.

What is claimed is:

1. A ceramic structure having at least one wall comprising at least two spaced overlying layers of ceramic material consisting essentially of 12 parts powdered glass, 9½ parts Bedminster clay, 26 parts Jordan clay, 7½ parts Victoria clay, 4 parts Layton clay, 10 parts Exeter clay, 8 parts syanite, 10 parts aluminum silicate, 3 parts Barker talc, 11 parts Hudson flint No. 103, and 32½ liters of water containing 153 cc. sodium silicate and 130 grams of sodium carbonate for each 100 pounds of water, said layers being integrally formed one with the other, means sealing the space between said layers and a low density insulating material substantially filling said space.

2. A ceramic structure according to claim 1 wherein said filler material is mica.

3. A ceramic structure according to claim 1 wherein said structure is coated with a glaze consisting essentially of 22 parts powdered glass, 11.9 parts Bainbridge feldspar, 5 parts Bedminster clay, 5.9 parts Layton clay, 5.6 parts calcined zinc, 10.4 parts white lead, 3.55 parts whiting, 23.75 parts tin oxide, 23.75 parts zirconium silicate, 4.5 parts of borax, 2 parts of Barker talc for every 5 parts of the mixture and 3 parts of water for each part of the final mixture.

References Cited in the file of this patent

UNITED STATES PATENTS

| | | |
|---|---|---|
| 1,305,903 | Johnston | June 3, 1919 |
| 2,077,610 | Bahl | Apr. 20, 1937 |
| 2,288,661 | Waldman | July 7, 1942 |
| 2,526,165 | Smith | Oct. 17, 1950 |

FOREIGN PATENTS

| | | |
|---|---|---|
| 6,699 | Great Britain | Feb. 25, 1915 |
| 235,980 | Great Britain | July 2, 1925 |